(12) United States Patent
Sullivan

(10) Patent No.: US 6,899,376 B1
(45) Date of Patent: May 31, 2005

(54) ONE PIECE A-PILLAR AIR DEFLECTOR AND WINDSHIELD MOLDING

(75) Inventor: Matthew M. Sullivan, St. Joe, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/755,634

(22) Filed: Jan. 12, 2004

(51) Int. Cl.[7] .............................................. B62D 37/02
(52) U.S. Cl. ....................... 296/180.1; 296/91; 454/130
(58) Field of Search .......................... 296/91, 93, 95.1, 296/152, 208, 180.1, 180.2, 180.4; 454/130

(56) References Cited

U.S. PATENT DOCUMENTS

| | | | |
|---|---|---|---|
| 1,737,094 A * | 11/1929 | Pritchard | 296/93 |
| 1,763,603 A * | 6/1930 | Donahue | 296/93 |
| 3,072,431 A * | 1/1963 | Shumaker | 296/91 |
| 3,785,699 A * | 1/1974 | Molaskey et al. | 296/152 |
| 4,081,195 A * | 3/1978 | Gotz | 296/180.1 |
| 4,393,753 A * | 7/1983 | Chatlos | 454/130 |
| 4,700,980 A * | 10/1987 | Jozefczak | 296/180.1 |
| 4,772,066 A | 9/1988 | Leschke et al. | |
| 5,150,941 A * | 9/1992 | Silzer et al. | 296/152 |
| 5,193,875 A * | 3/1993 | Tamura | 296/93 |
| 5,251,953 A | 10/1993 | Willey | |
| 6,409,244 B1 | 6/2002 | Nagahashi et al. | |

\* cited by examiner

*Primary Examiner*—Lori L. Coletta
(74) *Attorney, Agent, or Firm*—Jeffrey P. Calfa; Dennis Kelly Sullivan; Susan L. Lukasik

(57) ABSTRACT

A motor vehicle provides redirection of the slipstream to keep side windows of the vehicle clear of grime thrown into the path of the vehicle as spray or carried by precipitation. Redirection of the slipstream is provided by a turbulence or eddy generating protrusions extending into the slipstream from the vehicle's A-pillars. The protrusions or contours may be formed integrally with the encapsulation molding attached around the circumference of the vehicle's windshield.

9 Claims, 6 Drawing Sheets

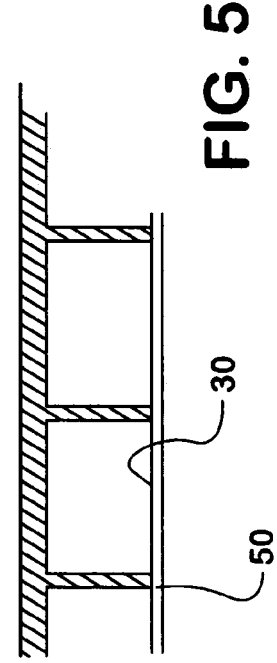
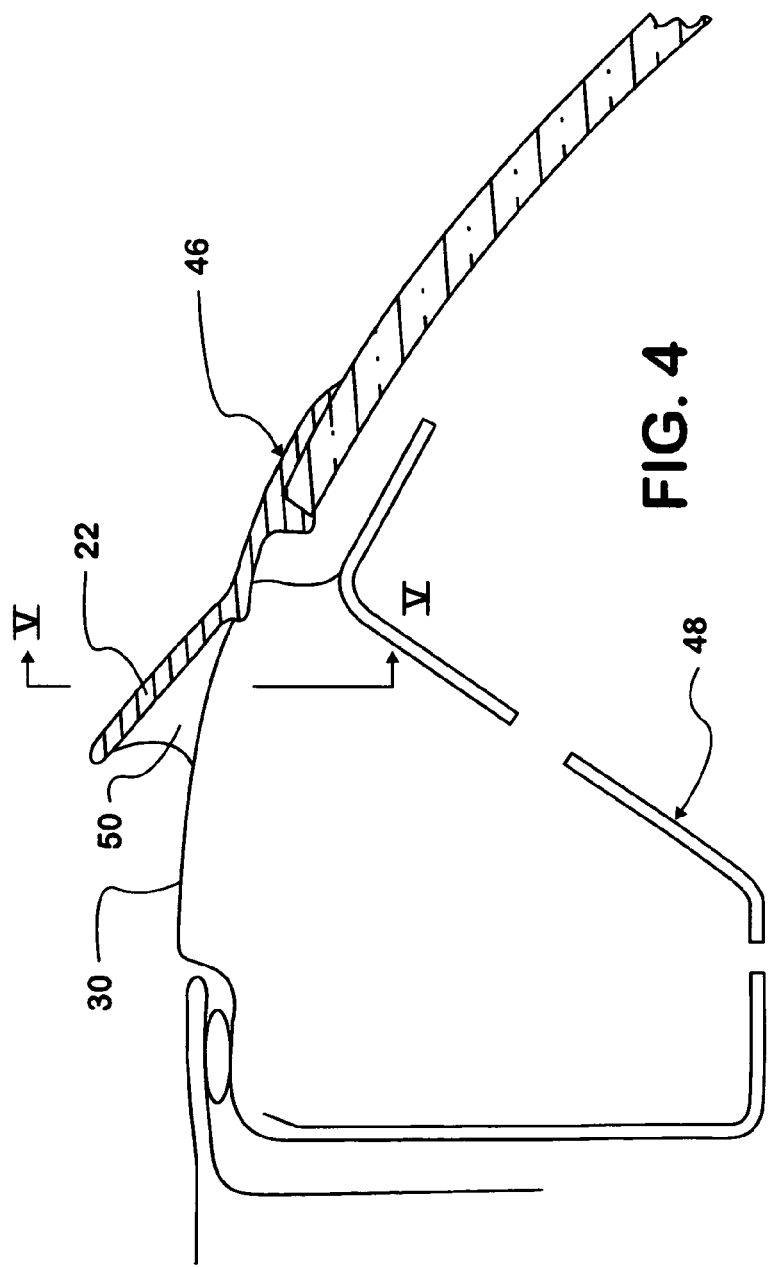

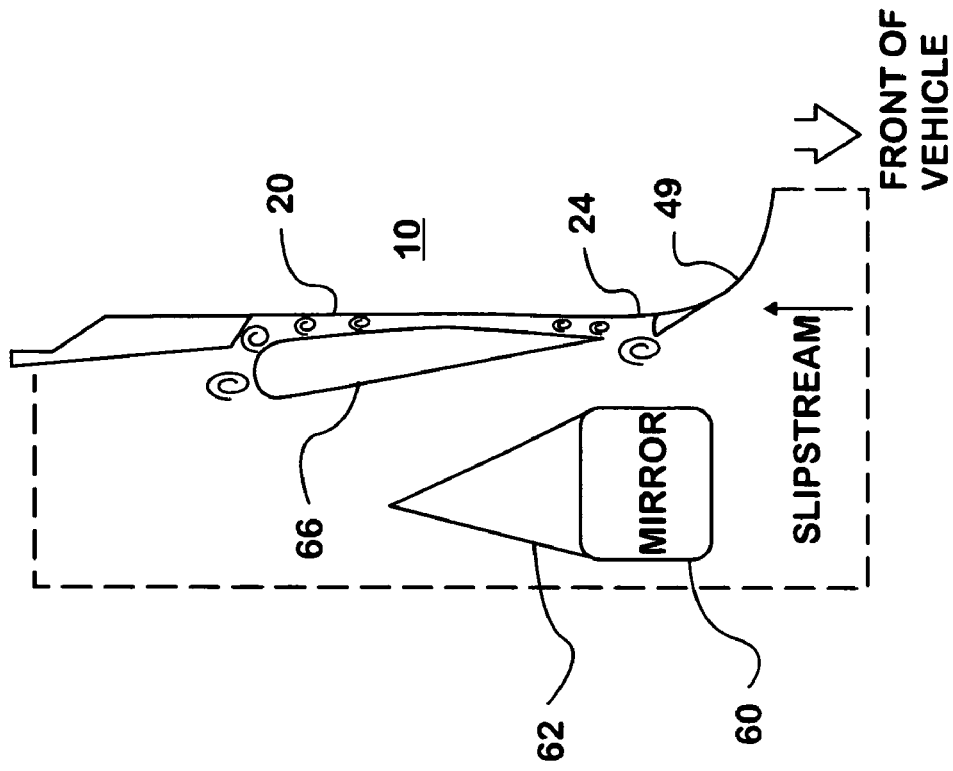
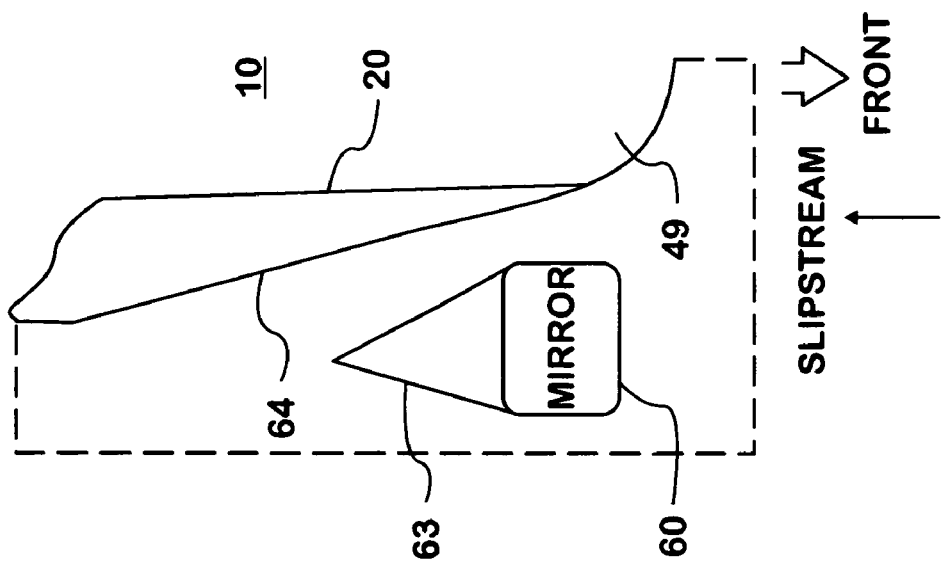

ONE PIECE A-PILLAR AIR DEFLECTOR AND WINDSHIELD MOLDING

BACKGROUND OF THE INVENTION

1. Technical Field

The invention relates to an air deflector for keeping the side windows of a motor vehicle clear of water borne dirt and grime.

2. Description of the Problem

The adhesion of dirt and grime on the side windows of motor vehicles during periods of rain and especially when roads are wet from rain or melting snow is well known to drivers. Some of the problem stems from precipitation and spray hitting the windshield and then flowing around the windshield to the side of the vehicle. Here it can be caught in an area inside the slipstream adjacent to the vehicle allowing it to collect on the surface of the windows. Still more dirt is simply carried by water particles directly against the windows. Motor vehicle manufacturers have attempted to address the problem by incorporating a water catching channel into the windshield molding which directs dirty water up and over the windows. In contemporary vehicle assembly a windshield molding is attached around the circumference of the windshield to provide a tight seal between the window glass and the vehicle body. The water catching groove can be formed in the molding for channeling water along the A-pillars on both sides of the windshield.

Such grooves or channels have usually been formed by a depression in the mold. German laid open application 36 00 504 A1 teaches a channel formed by a projecting forward swept lip mounted to the vehicle's A-pillar. The channel is located at the base ends of the forward swept lip and an attachment lip secured to the A-pillar.

SUMMARY OF THE INVENTION

According to the invention there is provided a slipstream deflector mounted on vehicle for generating turbulence in the slipstream adjacent the vehicle's side windows and acting to prevent accumulation of dirt and grime carried by road spray and precipitation on the vehicle's side windows. The left and right side deflectors are located on left and right side vehicle A-pillars. The deflectors have reverse swept contours and extend outwardly from and parallel to the left and right side A-pillars. The deflectors extend outwardly from the A-pillars into any slipstream generated by forward movement of the vehicle. The left and right side A-pillars further define, in part, a windshield frame. A windshield is set in the frame. A seal between the frame and the windshield is provided by a windshield molding attached around the circumference of a windshield. The windshield molding includes an inwardly directed lip extending over an outer surface of the windshield and an outwardly directed lip extending back over an interior perimeter of the frame. The left and right side reverse swept deflectors are formed integrally with sides of the windshield molding adjacent the A-pillars, and extend from the outwardly directed lip. By "reverse swept" it is meant that the deflectors have a base which is forward on the vehicle relative to the outward tip of the deflector and the deflector does not act as a water catching channel for material coming off the windshield.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a cross sectional view taken along section line III—III of an alternative embodiment of the invention to that shown in FIG. 3.

FIG. 5 is a cross sectional view taken along a reverse swept contour parallel to a vehicle A-pillar as illustrated by section line V—V in FIG. 1.

FIG. 7 is a schematic illustration of operation of the invention on a vehicle.

DETAILED DESCRIPTION OF THE INVENTION

Figure 1:
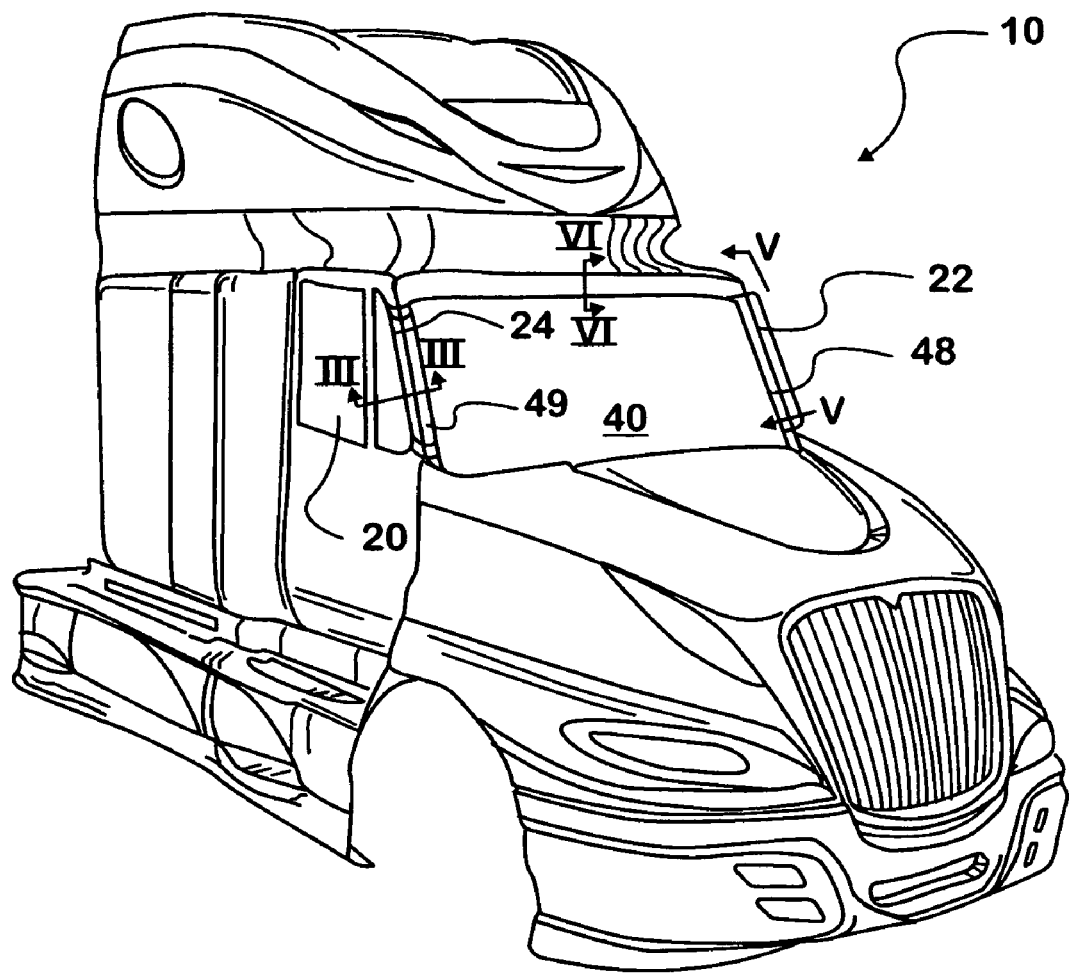
FIG. 1 is a perspective view of a truck cab incorporating the invention.

Referring now to the figures and in particular to FIG. 1, where a truck cab 10 is shown. Truck cab 10 is equipped with a forward oriented windshield 40 and side windows including passenger side window 20 which may be subject to the accumulation of dirt from road spray and precipitation. Windshield 40 is mounted on truck cab 10 between left side and right side A-pillars 48 and 49. Passenger side window 20 is located along the side of the vehicle behind right side A-pillar 49. A driver side window (not shown) is similarly located behind left side A-pillar 48. Extending outwardly from A-pillars 48 and 49 are air deflectors 22 and 24. Absent the air deflectors the slipstream which envelopes cab 10 at highway speeds tends to separate along the side of the vehicle creating a dead zone adjacent the side windows into which particles carried by the slipstream can escape. Deflectors 22 and 24 introduce turbulence to the slipstream which moves any dead zone away from the side of the vehicle and hinders the collection of grime and grit on the side windows.

Figure 2:
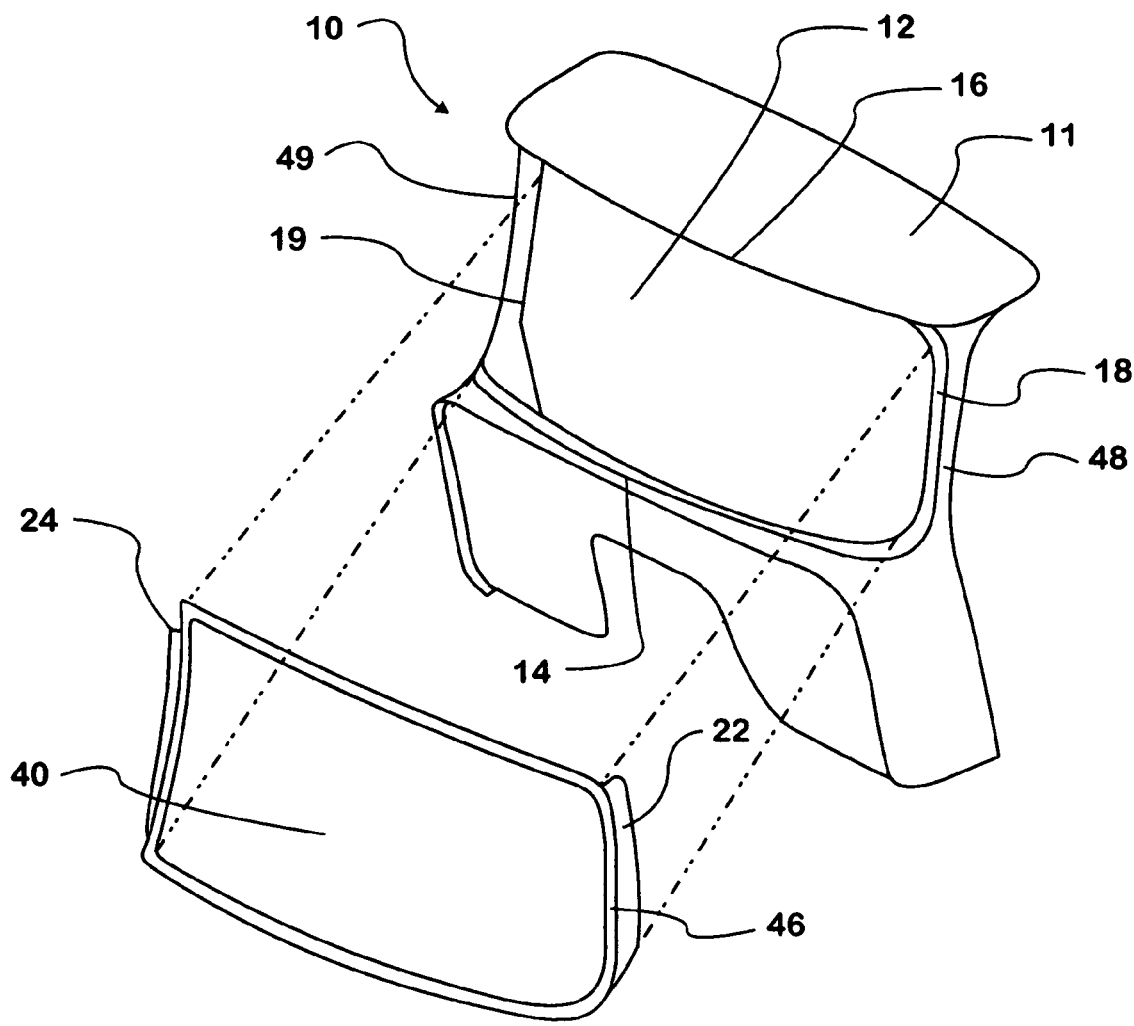
FIG. 2 is an exploded view of the windshield/cab assembly.

FIG. 2 illustrates attachment of windshield 40 to a truck cab 10. Truck cab 10 has a frame 11 with a windshield opening 12 bordered by windshield frame sides 14, 16, 18 and 19. An encapsulated windshield trim piece 46, which is preferably a molded element, is attached around the perimeter of windshield 40 and, upon mating of the windshield with frame 11, extends over portions of the cab 10 adjacent windshield opening 12. Trim piece 46 hides a gap between windshield glass and A-pillars 48 and 49, as well as between the windshield glass and the cab roof along the top edge of the glass. Trim piece 46 may be a one piece molding and preferably incorporates two air deflectors 22 and 24 which extend from sides of the trim piece adjacent A-pillars 48 and 49.

Figure 3:
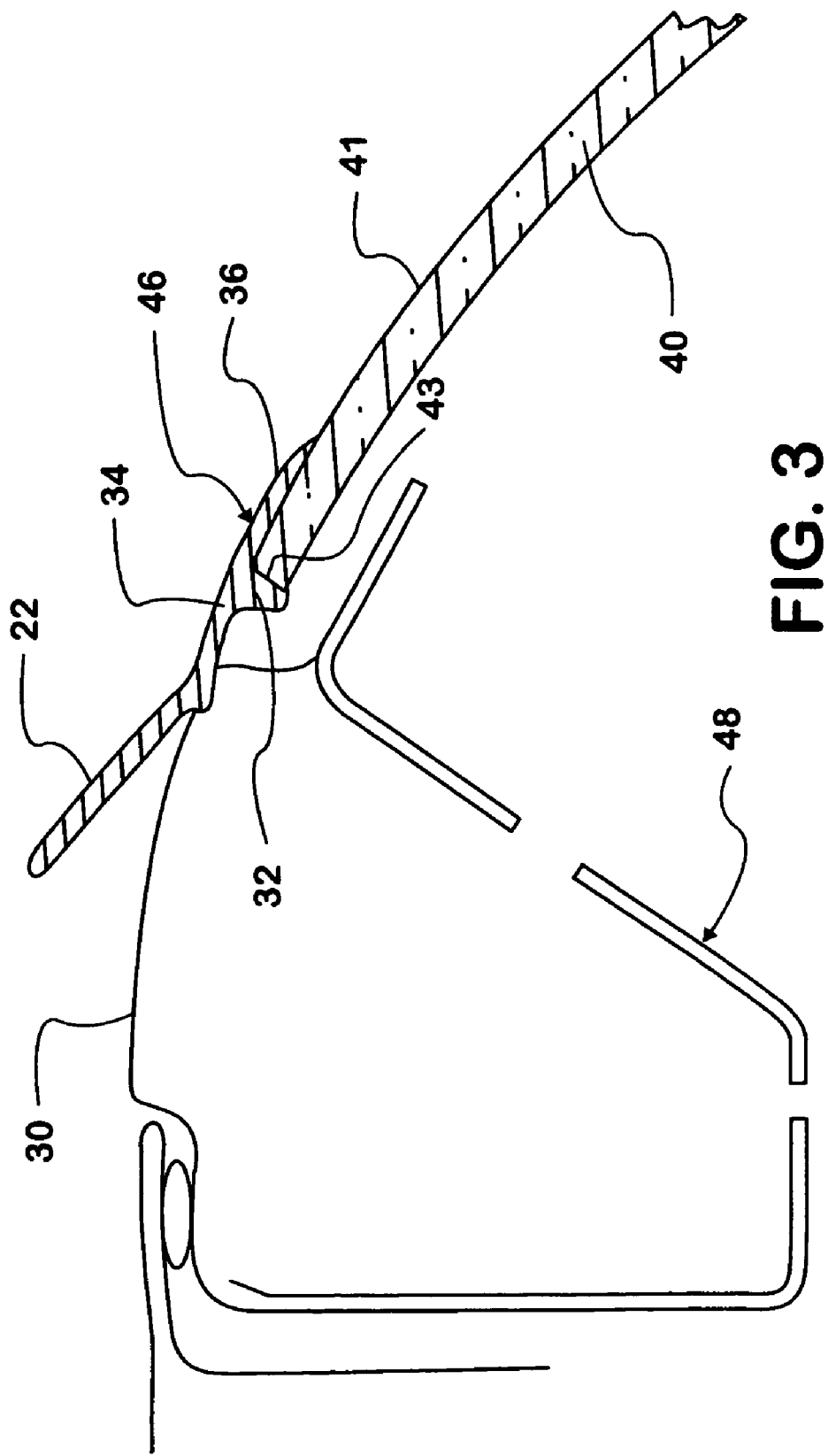
FIG. 3 is a cross sectional view taken along section line III—III in FIG. 1.

Referring now to FIG. 3, a cross sectional view of trim piece 46 taken along section line III—III of FIG. 1 illustrates a preferred configuration of the trim piece 46 to provide for encapsulation of the windshield 40 and to provide a wind deflector 22 along a driver side A-pillar 48. Trim piece 46 comprises a base, circumferential protrusion 32 which abuts an edge 43 of the windshield glass. Extending inwardly from base 32 over an exterior face 41 of the glass is a lip 36 which adheres to the glass by known methods. Extending outwardly from base 32, in the opposite direction from the inwardly directed lip 36, is a second lip 34 which extends over a portion of the exterior face 30 of A-pillar 48. At the end of lip 34 distal to base 32 is the base of an air deflector 22, which takes the form of a flap or spoiler extending outwardly from the A-pillar 48 but which is reverse swept relative to the prevailing slipstream direction. Air deflector 22 preferably extends from the top of A-pillar 48 to its bottom, but not around the top and bottom sides of the trim piece 46. Air deflector 24 is similarly configured.

FIGS. 4 and 5 illustrate an alternative embodiment of the invention in which the position of air deflector 22 is reinforced by a plurality of ribs or buttresses 50 which extend inwardly from a face of the deflector opposite the exterior surface 30 of A-pillar 48 toward the exterior surface. The buttresses 50 inhibit movement of and flex damage to air deflector 22.

Figure 6:
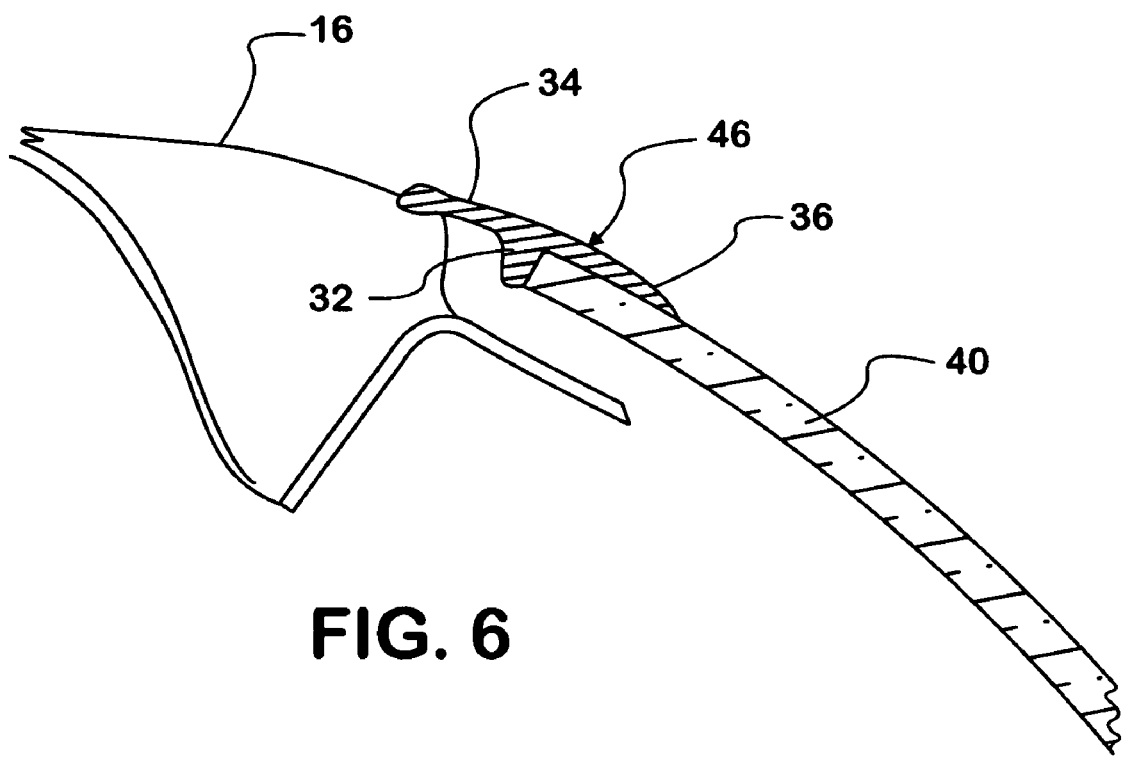
FIG. 6 is a cross sectional view taken along section line VI—VI in FIG. 1.

FIG. 6 shows the cross sectional profile of trim piece 46 taken along section lines VI—VI of FIG. 1 where windshield 40 is mated with the cab's roof. Outwardly oriented lip 34 carries no air deflector adjacent the vehicle roof. A similar arrangement holds along the bottom edge of windshield 40.

FIGS. 7A and 7B provide a comparison of slipstream flow around a cab 10 equipped with the right side A-pillar air deflector 24 (FIG. 7B) and one missing such a deflector (FIG. 7A). The slipstream in both cases is so labeled and flows from the front of the vehicle around to the side and back of the vehicle. Areas of stagnation are indicated by shaded areas 62 (in the wind shadow of exterior mirror 60), 64 (along the side of the vehicle) and 66 (along side but spaced from the side of the vehicle). Air flow in FIG. 7B eddies back along the surface of window 20 in the lee of deflector 24 assuring that zone 66 is spaced from window 20. Continuous air circulation adjacent window 20 helps keep dirt and grime particles suspended in the slipstream and reduces the quantity of dirt losing momentum and settling on the surface of window 20. Forming the deflector as one piece with the windshield edge molding reduces tooling costs and avoids adding parts in providing such a deflector.

While the invention is shown in only two of its forms, it is not thus limited but is susceptible to various changes and modifications without departing from the spirit and scope of the invention.

What is claimed is:

1. A vehicle windshield molding attached around the circumference of a windshield and set in a frame defined by a body of a vehicle, the vehicle windshield molding comprising:
   a first lip extending inwardly across the outside of the windshield;
   a second lip extending outwardly in a direction opposite to the first lip and with the first lip covering a gap between the windshield and the frame; and
   left and right side reverse swept deflectors extending outwardly from the second lip adjacent vehicle A-pillars into a slipstream generated by forward movement of the vehicle.

2. A vehicle windshield molding as set forth in clam 1, further comprising:
   the left and right side reverse swept deflectors each being a relatively thin protrusion spaced outwardly from the adjacent A-pillar.

3. A vehicle windshield molding as set forth in claim 2, further comprising:
   a circumferential base abutting end edges of the windshield and disposed in the gap between the edge of the windshield and the frame; and
   the first lip extending inwardly from the circumferential base and the second lip extending outwardly from the circumferential base.

4. A vehicle windshield molding as set forth in claim 3, further comprising:
   a plurality of buttresses extending inwardly from the reverse swept deflector toward the vehicle A-pillars to support the position of the reverse swept deflector against the slipstream.

5. A vehicle windshield molding as set forth in claim 4, wherein the vehicle windshield molding serves as an encapsulation end piece fully covering the gap between the frame and the windshield.

6. A vehicle windshield molding as set forth in claim 5, wherein the reverse swept deflector generates turbulence in the slipstream adjacent the vehicle side windows.

7. A vehicle comprising:
   left and right side windows;
   left and right side A-pillars forward from the left and right side windows;
   left and right side reverse swept deflectors extending from the left and right side A-pillars into any slipstream generated by forward movement of the vehicle;
   a windshield frame defined in part by the left and right side A-Pillars;
   a windshield set in the windshield frame;
   a windshield molding attached around the circumference of a windshield, the windshield molding including an inwardly directed lip extending over an outer surface of the windshield and an outwardly directed lip extending back over an interior perimeter of the windshield frame; and
   the left and right side reverse swept deflectors being formed integrally with the windshield molding.

8. A vehicle as set forth in claim 7, the windshield molding further comprising:
   a circumferential base protrusion abutting end edges of the windshield and disposed in a gap between the edge of the windshield and the windshield frame;
   the first lip extending inwardly from the base protrusion; and
   the second lip extending outwardly from the base in a direction opposite to the first lip.

9. A vehicle as set forth in claim 8, further comprising:
   each reverse swept deflector defining a steadily widening gap between an inner face and its respective A-pillar from front to rear; and
   a plurality of buttresses extending inwardly from the reverse swept deflector toward the vehicle A-pillars to support the position of the reverse swept deflector against a slipstream.

* * * * *